(12) United States Patent
Pederson

(10) Patent No.: US 11,193,728 B2
(45) Date of Patent: Dec. 7, 2021

(54) LOW COEFFICIENT OF FRICTION BOWSTRING FIBER COATING BACKGROUND

(71) Applicant: Mark Pederson, Minneapolis, MN (US)

(72) Inventor: Mark Pederson, Minneapolis, MN (US)

(*) Notice: Subject to any disclaimer, the term of this patent is extended or adjusted under 35 U.S.C. 154(b) by 0 days.

(21) Appl. No.: 16/823,349

(22) Filed: Mar. 19, 2020

(65) Prior Publication Data

US 2021/0293506 A1  Sep. 23, 2021

(51) Int. Cl.
*F41B 5/14* (2006.01)
*C08L 27/18* (2006.01)

(52) U.S. Cl.
CPC ............ *F41B 5/1411* (2013.01); *C08L 27/18* (2013.01)

(58) Field of Classification Search
CPC ................................ F41B 5/1411; C08L 27/18
USPC ............................................................ 124/90
See application file for complete search history.

(56) References Cited

U.S. PATENT DOCUMENTS

| 5,598,831 | A  | * | 2/1997  | Izuta     | F41B 5/1411 |
|           |    |   |         |           | 124/90      |
| 5,715,804 | A  | * | 2/1998  | Izuta     | F41B 5/1411 |
|           |    |   |         |           | 124/90      |
| 5,884,617 | A  | * | 3/1999  | Nelson    | F41B 5/1411 |
|           |    |   |         |           | 124/90      |
| 6,651,643 | B2 | * | 11/2003 | Simonds   | F41B 5/14   |
|           |    |   |         |           | 124/90      |
| 10,156,417| B1 | * | 12/2018 | Jolley    | F41B 5/1411 |
| 2015/0345891| A1 | * | 12/2015 | McPherson | F41B 5/1411 |
|           |    |   |         |           | 124/25.6    |
| 2016/0025444| A1 | * | 1/2016  | Griggs    | F41B 5/1411 |
|           |    |   |         |           | 124/90      |

\* cited by examiner

*Primary Examiner* — Alexander R Niconovich
(74) *Attorney, Agent, or Firm* — Dicke, Billig & & Czaja, PLLC

(57) ABSTRACT

The present invention relates to abrasion resistance of bowstring fibers with a coating containing Polytetrafluoroethylene (PTFE) particles to increases string life. The claimed coating lowers the coefficient of friction of the bowstring reducing internal yarn on yarn abrasion, external abrasion and increases longevity.

6 Claims, 1 Drawing Sheet

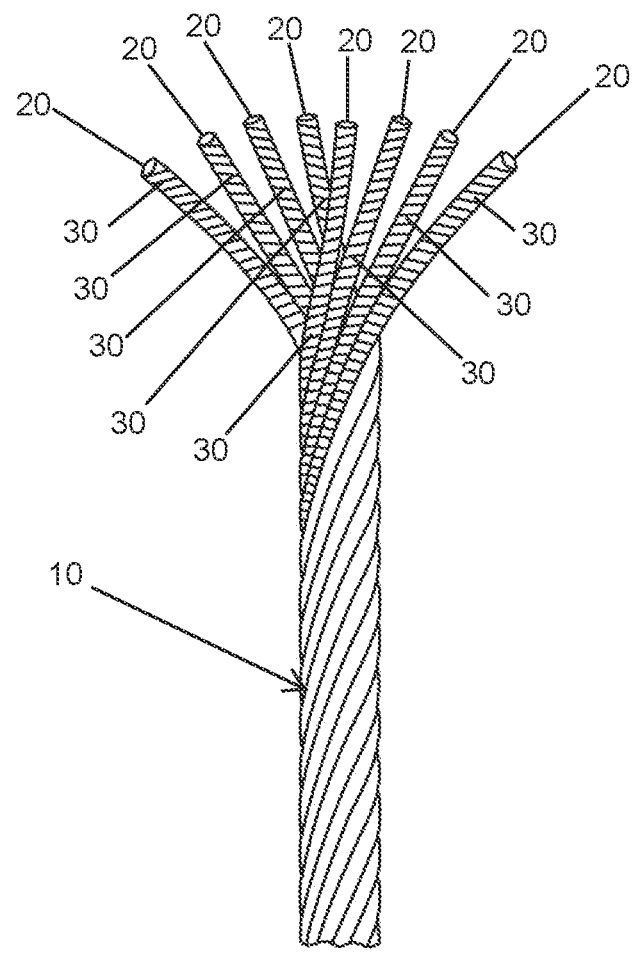

LOW COEFFICIENT OF FRICTION BOWSTRING FIBER COATING

BACKGROUND

BACKGROUND

Copyright Notice

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Field of the Invention

The present invention relates to a coating used on bowstring material used for archery bows. This coating contains PTFE particles dramatically increases string life, performance and manufacturability.

DESCRIPTION OF THE RELATED ART

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

An archery bow stores energy when an archer draws the bowstring. When the bowstring is released, the stored energy propels the arrow. There have been advances in the materials used for making bowstrings. Some of the earliest bowstrings were manufactured from animal fibers such as sinew. Later, bowstrings were manufactured from other fibers such as polyester and high modulus polyethylene.

Advancements in bowstring materials, design, and preparation have led to reduced string stretch in general. Despite these advancements, however, there remains a need for bowstrings having reduced stretch and elongation as the bow is used. There further remains a need for bowstrings that are quieter and faster shooting, for example producing less noise and vibration at launch.

U.S. Pat. No. 5,884,617 describes bowstrings constructed of braided strands, preferably comprising flat braids, from a high strength mixture of yarns comprising abrasion-resistant fibers and yarns comprising high strength, creep resistant fibers.

U.S. Pat. Nos. 5,676,123, 5,676,123, 5,752,469, 6,651,643, 7,182,079, 7,231,915 and US 2012/0152219 teach examples of bowstrings.

None of the prior art methods have been found to be completely suitable to meet these needs and are cumbersome. The present invention provides such a method and the overall combination of these features is nowhere disclosed in the prior art cited above which appears to be representative of the general art in this area although it is not intended to be an all-inclusive listing of pertinent prior art patents.

SUMMARY

In light of the disadvantages of the prior art, the following summary is provided to facilitate an understanding of some of the innovative features unique to the present invention and is not intended to be a full description. A full appreciation of the various aspects of the invention can be gained by taking the entire specification, claims, and abstract as a whole.

In order to solve the above problems, the method and system of this invention focuses to improved properties such as good life expectancy, enhance bow performance and bowstring manufacturability.

Another embodiment of the present invention is to improve the abrasion resistance of bowstring fibers with a coating containing Polytetrafluoroethylene (PTFE) particles to increase string life.

Another object is to provide a novel PTFE coating which protects the bowstring fibers more effectively reducing the amount of needed continual maintenance required by the customary bowstring wax coating.

It is another object of this invention to reduce the coefficient of friction coating which allows for individual strands of a bowstring to balance by sliding relative to each other allowing for more balanced load sharing and reduced manufacturing time.

Briefly, it is a principal object of the invention to provide bowstring material coated with a coating containing Polytetrafluoroethylene (PTFE). This coating applied to the suing material lowers the coefficient of friction of the bowstring and reduces wear and tear, reduces string fuzziness and increases longevity. The outcome is a bowstring that is second-to-none when it comes to durability and performance.

It is thus a primary object of the present invention to provide coated bowstring material containing PTFE. A bowstring which comprises a plurality of components, the bowstring having been formed using strands that comprise, or consist of, minimally twisted fibers applied with coating containing PTFE This Summary is provided merely for purposes of summarizing some example embodiments, so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, and Claims.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 1 is a view of the strands 20 used to construct a bowstring 10.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration" Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. Furthermore, there is no intention to be bound by any expressed or implied theory presented in the preceding technical field, background, brief summary or the following detailed description. It is also to be understood that the specific devices and processes described in the following specification, are simply exemplary embodiments of the inventive concepts defined in the appended claims. Specific dimensions and other physical characteristics relating to the embodiments disclosed herein are therefore not to be considered as limiting, unless the claims expressly state otherwise.

Unless otherwise defined, all terms (including technical and scientific terms) used herein have the same meaning as commonly understood by one having an ordinary skill in the art to which the invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques are disclosed. Each of these has individual benefit and each can also be used in conjunction with one or more, or in some cases all, of the other disclosed techniques. Accordingly, for the sake of clarity, this description will refrain from repeating possible combination in an unnecessary fashion. Nevertheless, the specifications and claims should be read with the understanding that such combinations are entirely within the scope of the invention and the claims.

The method of the present invention is that it relates to bowstring fibers 20 with a coating 30 containing Polytetrafluoroethylene (PTFE) particles has been designed. The result is increased string life and durability.

In some embodiments, the invention relates to a bowstring 10 in which during manufacturing process the string is typically held under tension or cycled tension to allow the fibers 20 to balance and remove constructional elongation. This coating 30 reduces the amount of cycle time needed before constructional elongation is removed, providing improved manufacturability.

The PTFE coating 30 is applied to the individual strands 20 shown in FIG. 1. It can be applied via different methods including dip tank, kiss roller, spray or other. The coating 30 can also be applied to a finished string 10 after it has been constructed as well.

PFTE coating 30 is applied to fiber yarns 20 or strands using dip tank, spray method, kiss roller or other methods. Coating 30 may also be applied to finished fibers. Dry PTFE coating weight should be 0.05% to 20% of total yarn weight depending on manufacturing method used.

Another embodiment of the current invention is PTFE which has a low coefficient of friction value (0.05-0.10), this low friction value provides external abrasion resistance, reduced yarn on yarn friction and allows the fibers to share load evenly.

The bowstring 10 is formed in a number of steps. In some embodiments, the fibers 20 are first formed. In some embodiments, the fibers 20 are drawn or spun from one or more polymeric materials. The fibers are then bundled together into yarns. PFTE coating 30 can be applied to any similar method.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. A bowstring comprising:
   a plurality of fiber strands;
   wherein each of the plurality of fiber strands are individually coated with a coating;
   wherein each of the plurality of coated fiber strands are twisted together thereby forming the bowstring; and
   wherein the coating comprises polytetrafluoroethylene such that the coefficient of friction between the plurality of fiber strands is decreased thereby reducing wear and tear, reducing string fuzziness, and increasing longevity.

2. The bowstring of claim 1, wherein the polytetrafluoroethylene has a coefficient of friction between 0.05 and 0.10.

3. The bowstring of claim 1, wherein the polytetrafluoroethylene particles makes up 0.05% to 20% of a total bowstring strand weight.

4. A method of forming a bowstring comprising:
   providing a plurality of fiber strands;
   applying a polytetrafluoroethylene coating on each of the plurality of fiber strands; and
   after applying the coating, twisting the plurality of strands into the bowstring.

5. The method of claim 4, wherein prior to twisting the plurality of strands, holding the bowstring under tension to allow the fibers to balance and remove constructional elongation.

6. The method of claim 4, wherein the polytetrafluoroethylene is coated on each of the plurality of strands of the bowstring by submerging in a dip tank of polytetrafluoroethylene.

* * * * *